UNITED STATES PATENT OFFICE.

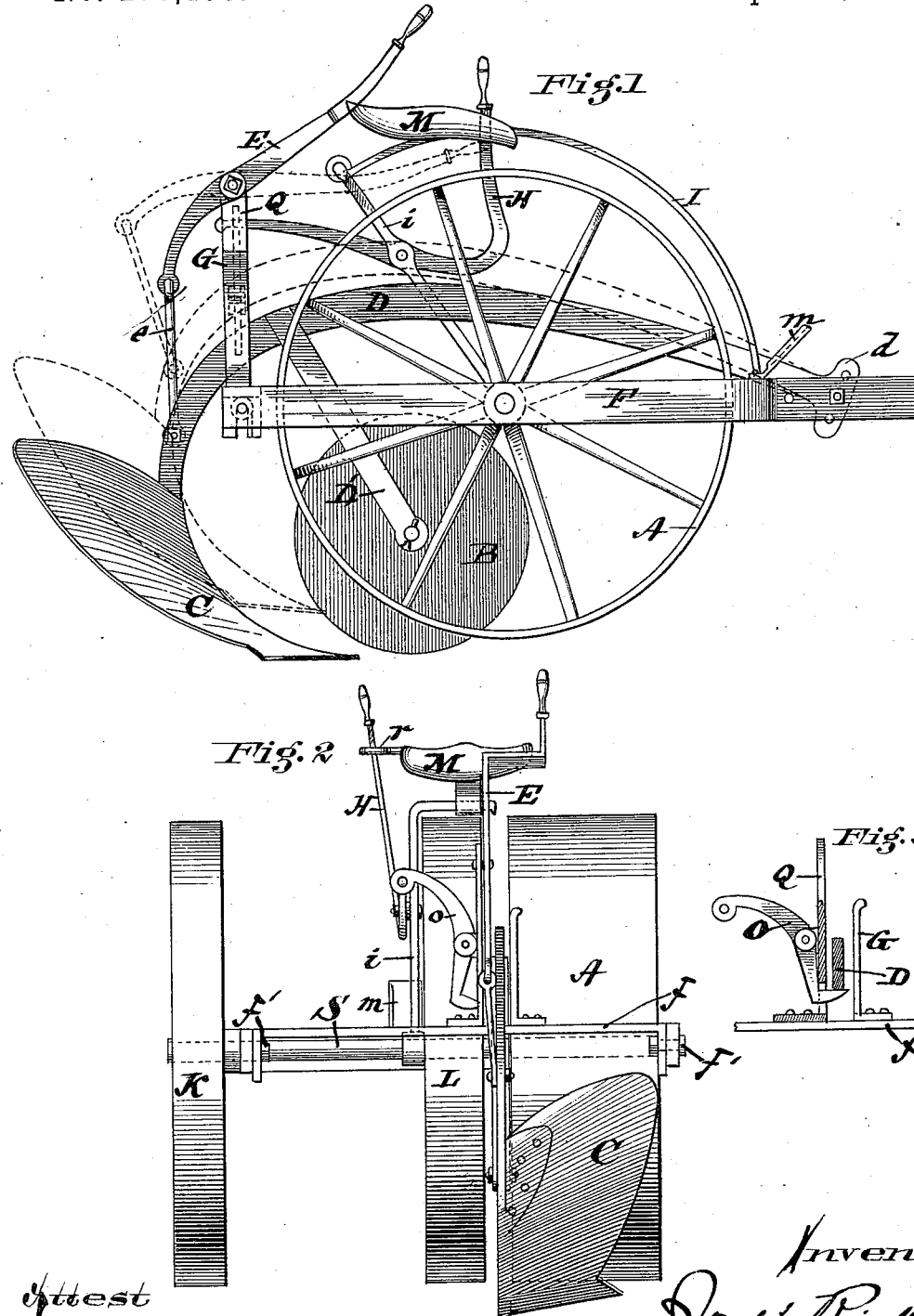

JOSEPH RICKEY, OF KANKAKEE, ILLINOIS.

SULKY-PLOW.

SPECIFICATION forming part of Letters Patent No. 276,193, dated April 24, 1883.

Application filed April 13, 1881. (Model.)

*To all whom it may concern:*

Be it known that I, JOSEPH RICKEY, of the city and county of Kankakee and State of Illinois, have invented a new and useful Plow, of which the following is a specification.

My invention relates to "sulky-plows," its object being to provide an implement adapted to turning down and plowing under cornstalks, weeds, clover, &c., in order to facilitate their decay and prepare the ground for a new planting.

To this end my invention consists in the combination, with a plow-carriage, of a broad-tread leveling-wheel and a covering-share, arranged to trail after and turn the earth in the path of said wheel.

The invention will be first described in detail, and the improvements afterward pointed specifically in the claims.

My invention is embodied in mechanism illustrated in the accompanying drawings, in which—

Figure 1 is a side elevation of my covering-plow complete. Fig. 2 is a rear elevation, and Fig. 3 is a detail view, of the locking device.

Similar letters of reference indicate similar parts in the specification and drawings.

A and K in the drawings designate the two main ground-wheels of the plow-carriage mounted upon the axle S. The carriage consists essentially of a rectangular frame composed of two side bars, F, preferably of iron, carried around the front of the wheels and turned forward, leaving a space for the insertion and attachment of the tongue between them, and for the attachment and adjustment of the forward end of the plow-beam, also between them in rear of the tongue. The rear part of the frame is a straight bar, $f$, turned down at the ends and inserted between the side bars, F, and held vertically adjustable by bolts $f'$ $f'$ in any convenient manner, which construction allows a vertical adjustment of the plow, which is supported on this part of the carriage, and also holds the frame rigid. The rear bar, $f$, may have notched ends and be operated by a sector-lever.

The plow-beam is attached by a clevis, $d$, and removable retaining-bolt between the front extensions of the braces F, and extends thence backward in a curve approximating a straight line, thence downward and forward, so as to bring its lower extremity in position to carry a covering-share, C, in line with and behind the ground-wheel A. The wheel A is formed with a broad tread adapted to roll down cornstalks, weeds, clover, and the like, and facilitate their plowing under by the share C.

To the rear brace, $f$, are attached two upright standards, Q and G, at either side of the plow-beam, which serve to guide the plow-beam when moved vertically and retain the share against lateral displacement. The two upright standards may be formed in one with a vertical slot for the play of the plow-beam; but the construction shown is preferred, as it admits the ready removal of the plow-beam for any purpose.

To the standard Q, which is extended upward sufficiently for the purpose, is pivoted a hand-lever, E, from the rear end of which the plow-beam is suspended by a link, $e$, and by these means the share may be elevated entirely from the ground when the carriage is traveling to and from its field of operation.

In order to retain the beam and its share in ultimate positions, I provide a locking-catch, O, substantially in the form of a bell-crank lever, pivoted to the standard Q in such manner that its vertical arm is moved to and from the standard laterally, and its horizontal arm is moved into and out of the space between the standards Q and G through a suitable slot in the standard Q, above or below the plow-beam, as the case may be. The construction is clearly shown in Fig. 3. The lever-catch $o$ is controlled by a hand-lever, H, pivoted to a standard, $i$, which supports the driver's seat above the axle. The hand-lever H moves upon a suitable rack-bar, $r$, attached to the side of the driver's seat, provided with recesses or other means of holding the lever in ultimate positions.

The driver's seat M is mounted on a spring-bar, I, secured to the frame in front of the wheels, and preferably of sufficient width to resist lateral strains. The bar arches above the wheels, and is pivoted at its rear end to a standard, $i$, which supports it above the axle. Foot-rests $m$ $m$ are attached to the frame F, in front, on either side of the plow-beam, and the elasticity of the spring I is such as to give an easy seat to the operator.

In the practical use of the apparatus as thus constructed it would often happen that a corn-stalk or weed, instead of being rolled down so as to lie in the line of travel, would lie diagonally across it, and the action of the covering-share would be impeded thereby, or the share would turn the stalk over longitudinally and impede the action of the machine otherwise and fail to cover the stalk in the earth. As a provision against such contingencies I attach to the axle a second wheel, L, running a few inches (about two is sufficient) from the wheel A. This is also a roller-wheel, of the same diameter as the wheel A, but need not be of so broad a tread. Between these two wheels a disk stalk-cutter or colter, B, is arranged to run, and is pivoted to an arm, D', rigidly secured to and depending from the plow-beam D, in such position as to travel between the wheels A and L, in or immediately in rear of their ground-contact line, and to cut about the same depth as the share C. It will thus be seen that the stalk is firmly held down by the wheels A and L in proper position for the action of the cutter B. The covering-share being gaged and adjusted to cut exactly in the path of the wheel A, the action of the cutter B is such that the portion of a stalk lying in the path of the plow is cut off, and is therefore easily and surely turned under. The cutter-disk B also acts as a colter in the usual manner and renders a landside upon the plow unnecessary.

In the construction of the share I extend it forward in an ellipsoidal curve, reproducing the curve of the beam above it, as shown in Fig. 1. I also extend the wing far out to the rear and laterally, as shown, giving to the share substantially the same curves of minimum resistance as are found in the prow of a well-modeled boat. There is no landside, and therefore the friction due to the ordinary construction is avoided. The lateral strength of the share is derived from the curved form of and mode of connecting the plow-beam. The clevis end in front being retained between the vertical walls of the frame, and the rear portion being held between the vertical standards Q and G, the entire structure is firmly held against lateral or twisting strains. As part of the construction directed to this function, I form the plow-beam of a flat bar of iron of long rectangular section, curved in the plane of its greatest width, which feature of construction, as will be obvious, is applicable to sulky-plows generally.

Having described my invention, I claim and desire to secure by Letters Patent—

1. In a sulky-plow, in combination with the roller-wheel A and plow, arranged and operating as described, a supplemental roller-wheel, L, laterally adjacent to the first, and a cutter arranged to cut vertically in a line between the roller-wheels, substantially as set forth.

2. The combination, in a sulky-plow, of a frame, F, mounted on wheels and provided at its rear with a rigid cross-brace, $f$, two upright guides, G and Q, secured to said brace, the curved plow-beam provided at its forward end with a perforated clevis vertically adjustable in the forward part of the wheeled frame, a lever for lifting the plow-beam, and a device on one of the upright guides arranged to engage and disengage the rear portion of the plow-beam, substantially as and for the purpose described.

3. The combination, with the wheeled frame having at its rear a cross-brace, $f$, provided with upright guides G and Q, and with the vertically-movable plow-beam D, of the lever E, connecting-rod $e$, the locking-catch O, pivoted on the guide Q, and the hand-lever H, for swinging the locking-catch between the guides to engage and disengage the plow-beam, substantially as described.

JOSEPH RICKEY.

In presence of—
SAMUEL MARRIOTT,
WARREN DARST.